June 15, 1926.
E. V. STONE
1,589,004
EXPANSIBLE PIVOT MEANS FOR CRANKS AND THE LIKE
Filed April 20, 1925    2 Sheets-Sheet 1
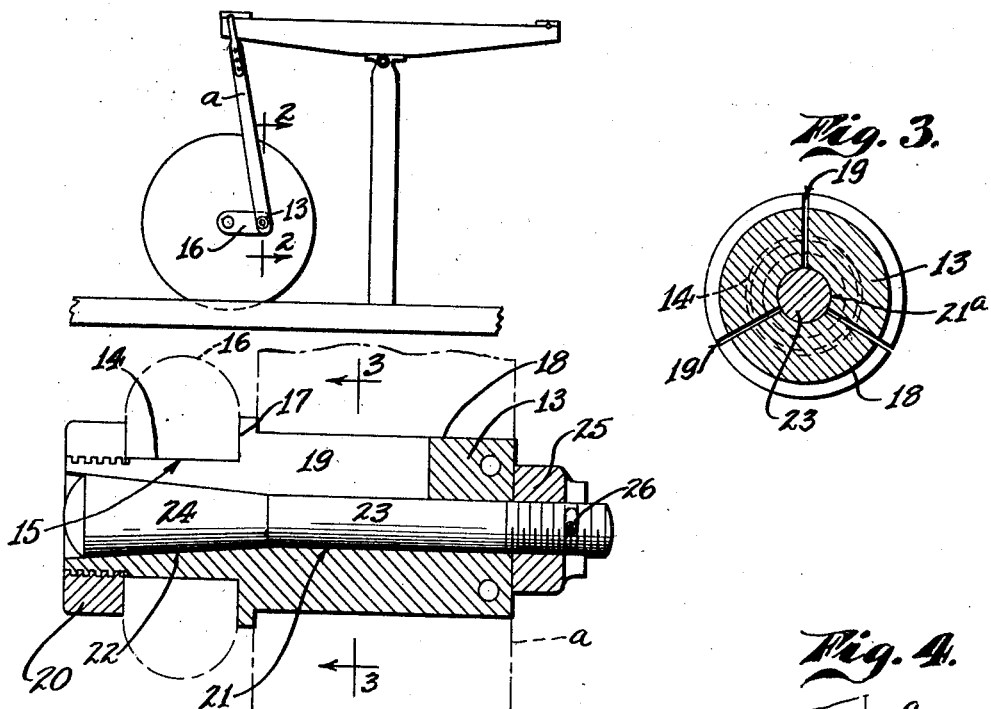
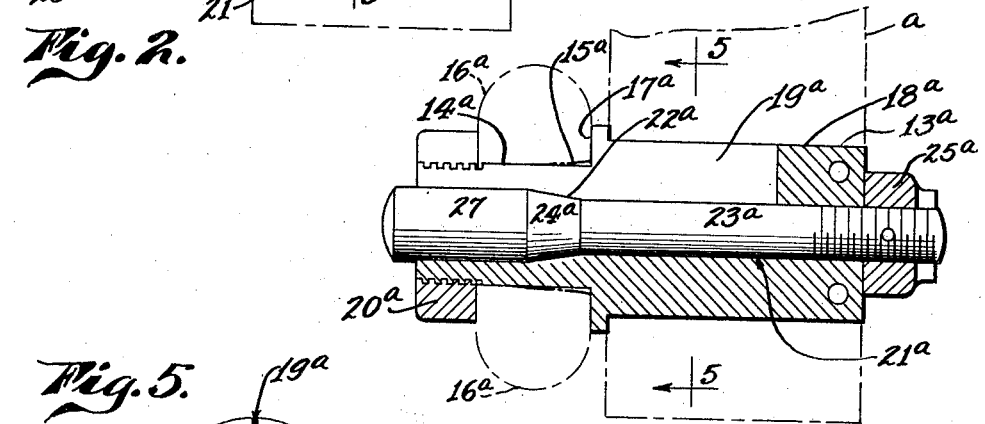
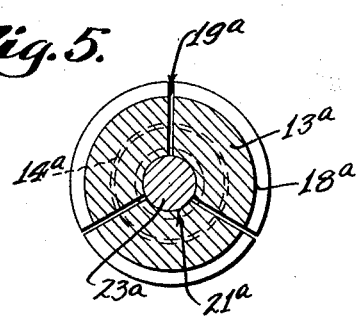
INVENTOR.
Ernest V. Stone;
BY
ATTORNEYS.

June 15, 1926.
E. V. STONE
1,589,004
EXPANSIBLE PIVOT MEANS FOR CRANKS AND THE LIKE
Filed April 20, 1925    2 Sheets-Sheet 2
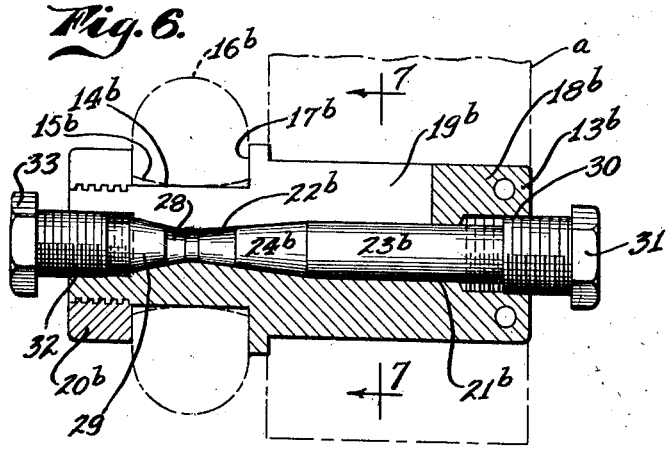
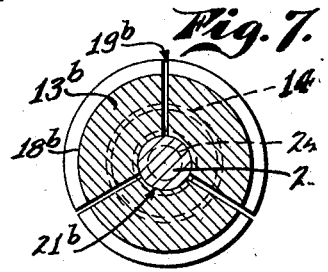
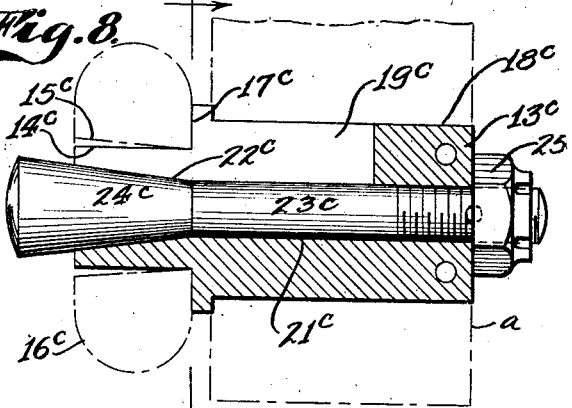
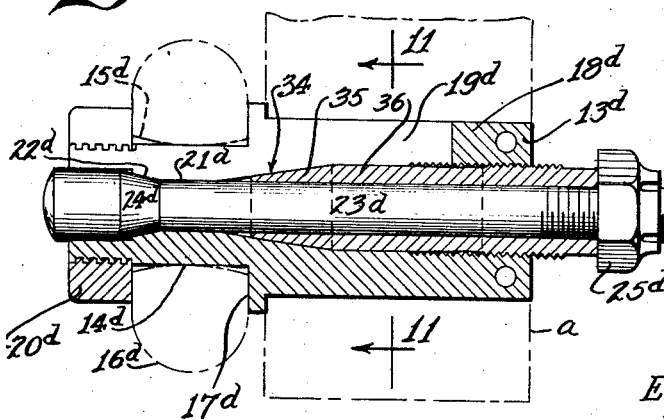
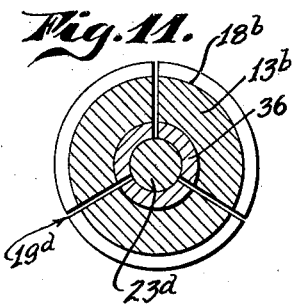
INVENTOR.
Ernest V. Stone;
BY Lyon & Lyon
ATTORNEYS.

Patented June 15, 1926.

1,589,004

UNITED STATES PATENT OFFICE.

ERNEST V. STONE, OF SANTA FE SPRINGS, CALIFORNIA, ASSIGNOR, BY DIRECT AND MESNE ASSIGNMENTS, TO HERMAN C. SMITH, OF WHITTIER, CALIFORNIA.

EXPANSIBLE PIVOT MEANS FOR CRANKS AND THE LIKE.

Application filed April 20, 1925. Serial No. 24,503.

This invention relates to expansible pivoting means of the type employed, for example, for pivotally connecting a pitman to a crank. One of the uses of the invention is in the art relating to the pumping of oil wells for connecting the pitman to the crank of the driving shaft to effect rocking of the walking beam that in turn operates the polish rod of the pump.

The pin at present employed for connecting the pitman to the crank, in the course of time, works loose and often forms an elongate hole so that, even when a new pin is placed in the elongate hole thus made, the pin does not properly fit said crank and, accordingly, soon becomes loose.

An object of this invention is to provide a split expansible bushing that, if placed in a circular hole, can be expanded tightly against the wall of the hole so that it is impossible for the bushing to work loose and deform the hole in which it is placed.

Another object is to provide a construction which, after the hole for the crank pin has been elongated or deformed in cross section, as explained above, can be expanded to fill the elongate hole so as to make a solid connection between the pin and the crank or other member in which the pin is fixed.

Further objects and advantages will appear in the subjoined detailed description.

The accompanying drawings illustrate several embodiments of the invention:

Fig. 1 is an end view of an expansible pivoting means embodying the invention and installed in a crank which is shown. A walking beam and a pitman are also shown.

Fig. 2 is an enlarged sectional elevation of the expansible means on the line indicated by 2—2, Fig. 1. A crank and pitman are indicated in dot and dash lines.

Fig. 3 is a transverse section on the line indicated by 3—3, Fig. 2.

Fig. 4 is a longitudinal section of a second form of the invention, a pitman and crank being indicated by dot and dash lines.

Fig. 5 is a transverse section of the second form on the line indicated by 5—5, Fig. 4.

Fig. 6 is a longitudinal section of a third form of the invention, a crank and pitman being indicated in dot and dash lines.

Fig. 7 is a transverse section of the third form on the line indicated by 7—7, Fig. 6.

Fig. 8 is a longitudinal section of a fourth embodiment of the invention, a pitman and crank being indicated in dot and dash lines.

Fig. 9 is a transverse section of the fourth form on the line indicated by 9—9, Fig. 8.

Fig. 10 is a longitudinal section of a fifth form of the invention, a crank and pitman being indicated in dot and dash lines.

Fig. 11 is a transverse section of the fifth form on the line indicated by 11—11, Fig. 10.

Referring first to the form of the invention disclosed in Figs. 1, 2 and 3, there is provided a split bushing 13 having a reduced portion 14 adapted to be slipped through the hole 15 in the crank or other member 16 in which the pivoting means is to be secured. The reduced portion 14 is terminated at its inner end by an external shoulder 17 which separates the portion 14 from a larger cylindrical portion 18 that forms a wrist pin which rotates within the bearing of the pitman a or other member that is to be pivotally connected with the crank or other member 16. The longitudinally extending slits in the bushing 13 are indicated at 19 and extend from the outer end of the reduced portion 14 to near the outer end of the larger portion 18.

A nut 20 is screw threaded onto the split portion 14 of the bushing and bears against one face of the member 16 to prevent endwise motion of the bushing in one direction, the shoulder 17 preventing endwise motion of the bushing in the opposite direction.

The bushing 13 is provided with a straight bore portion 21 and a tapered bore portion 22 which is reduced inwardly. The tapered portion 22 extends through the bushing portion lying between the shoulder 17 and nut 20. The bore 21, 22 receives a pin having a straight portion 23 and a tapered portion 24, the tapered portion 24 extending through the reduced portion 14 of the bushing. On the other end of the straight portion 23 of the pin is a nut 25 which is turned up against the adjacent end of the bushing 13 to hold the pin in place after it has been properly tightened in the bushing. The nut 25 threaded on to the pin portion 23 constitutes one form of threaded connection for holding the pin in place.

The type of expansible means described above is suitable for installing in a new crank before the hole in said crank has become elongated in cross section and, in practice, to install said means the reduced portion 14 of the bushing will be inserted in the hole 15 of the member 16 and then a metal bar of the proper size will be placed against the larger end of the pin 23, 24 and said bar will be struck with a sledge hammer to forcibly drive the pin to the right in Fig. 2, thus expanding the metal of the split portion of the bushing adjacent to the tapered pin portion 24, so that the peripheral face of the portion 14 will tightly engage the wall of the hole and prevent the bushing from working loose in the hole when the eccentric strain comes upon it in driving the member $a$. After the pin 23, 24 has been thus driven into place, the nut 25 will be tightened to prevent the pin from slipping endwise and the nut 25 may be locked by a cotter pin 26 extending through the pin.

Now referring to the second form of the invention illustrated in Figs. 4 and 5, the parts that functionally correspond to the elements described above are indicated by the same reference characters with the addition of the letter $a$. This form of the invention is especially useful for placing in a crank of which the hole $15^a$ has become elongated by reason of the pin not tightly fitting the hole in the crank when first installed, thereby permitting a wobbling movement of the pin, which movement destroys the symmetry of the hole. When this is the case and the resulting elongation in cross section of the hole is at one end only thereof, as indicated in Fig. 4, it is advisable to expand the metal of the bushing to a greater extent in the elongate portion of the hole than in the straight portion and, to effect this, the tapered portion $24^a$ of the pin is comparatively short and lies between the smaller straight portion $23^a$ and another larger straight portion 27, and the smaller diameter of the tapered bore portion $22^a$ extends only part way through the bushing portion lying between the shoulder $17^a$ and nut $20^a$. The nut $25^a$ threaded on to the pin portion $23^a$ constitutes one form of threaded connection for holding the pin in place.

The second form is installed the same as the first form described above and, when the pin is forcibly driven to the right in Fig. 4, it will be seen that that portion of the bushing $13^a$ immediately adjacent to the tapered bore portion $22^a$ will be expanded so as to completely fill the elongate hole $15^a$, thus solidly connecting the bushing to the member $16^a$.

Now referring to the third form of the invention disclosed in Figs. 6 and 7, the elements that are functionally the same as those described for Figs. 1 to 3, are indicated by the same reference characters, with the addition of the letter $b$. This form of the invention is more especially useful for connecting with a crank of which the hole for the pin has been elongated in cross section at both ends of the hole by a wobbling movement of the pin in said hole. In this case it is advisable to independently expand two different portions of the reduced portion $14^b$ of the bushing $13^b$. The reduced portion $14^b$ has bore portions $22^b$, 28 turned with their smaller diameters toward each other and extending toward the opposite ends of the portion $14^b$, and the tapered portion $24^b$ of a pin $23^b$, $24^b$ engages the tapered bore portion $22^b$ and a tapered portion 29 of another pin engages the tapered bore portion 28. The pin $23^b$, $24^b$ is screwed into one end of the bushing $13^b$, as indicated at 30, and is provided with a wrench head 31. The other pin has a straight threaded portion 32 which is screwed into the other end of the bushing $13^b$ and said pin is provided with a wrench head 33. The wrench head 31 and the portion of the pin $23^b$ that is threaded into the bushing $13^b$ constitute one form of threaded connection for holding the pin in place.

In this third form of the invention, after the bushing is inserted in the hole $15^b$, as described above, the heads 31, 33 will be turned by a wrench to force the tapered pin portions $24^b$, 29 farther into the tapered bore portions $22^b$, 28 respectively, thus expanding the metal adjacent said bore portions sufficient to completely fill the hole $15^b$, thus solidly connecting the bushing with the member $16^b$.

A fourth form of the invention is disclosed in Figs. 8 and 9 and the elements that functionally correspond with these previously described for Figs. 1 to 3, are indicated by the same reference characters with the addition of the letter $c$. The tapered bore portion $22^c$ extends through the externally tapered bushing portion $14^c$ that extends from the shoulder $17^c$ to one end of the bushing. In this instance the member $16^c$ is provided with a tapered hole $15^c$, the taper being uniform from side to side of the member $16^c$, the smaller end of the hole being adjacent to the shoulder $17^c$ so that when the tapered pin portion $24^c$ is driven to the right in Fig. 8, it will not only expand the metal of the bushing to fill the tapered hole $15^c$ but will serve to draw the bushing to the left so as to firmly seat the shoulder $17^c$ against the adjacent face of the member $16^c$. By this construction the nut 20, employed in the form of the invention shown in Figs. 1 to 3, may be dispensed with. This construction is especially useful for installing in a new crank. The nut 25° and the screw threads of the pin portion 23° constitute a form of threaded connection for holding the pin in place.

In Figs. 10 and 11 is shown a fifth form of the invention and the elements that are functionally the equivalent of those previously described for Figs. 1 to 3, are indicated by the same characters with the addition of the letter $d$. This construction may be used in place of that disclosed in Figs. 6 and 7 for separately expanding two different portions of the bushing so as to fill a hole that is elongate in cross section at both ends. In this instance the pin has the tapered portion $24^d$ bearing against the tapered bore portion $22^d$ and another tapered bore portion 34 of the bushing $13^d$ is engaged by the tapered end 35 of a sleeve which also has a straight portion 36, said sleeve surrounding the straight portion $23^d$ of the pin. The tapered bore portions $22^d$ and 34 are turned with their smaller diameters toward each other. The nut $25^d$ and the screw threads of the pin portion $23^d$ together constitute a form of threaded connection for holding the pin in place.

In practice, the bushing $13^d$ will be inserted in the member $16^d$ in the manner set forth above, and the nut $20^d$ will be tightened. Then the pin $23^d$, $24^d$ will be driven to the right in Fig. 10 and the sleeve 35 will be driven to the left in said figure to expand the metal of the bushing adjacent to the bore portions $22^d$, 34 so as to completely fill the hole $15^d$, thus solidly connecting the bushing to the member $16^d$. Then the nut $25^d$ will be screwed onto the pin and, in this instance, said nut will bear against the outer end of the sleeve portion 36, and thus said nut will prevent endwise slipping of both the pin and the sleeve.

It may be further pointed out that one reason for the crank pins now employed in structures of the type disclosed in Fig. 1 working loose in the crank and destroying the symmetry of the hole for the pin, is that it is not advisable for such pins to be made to fit too tightly for, if they were, it would be difficult to assemble the pins. With this invention, however, the pin is easily assembled in the crank, as it does not tightly fit the hole provided for it, and then the bushing is expanded so as to tightly fit the hole, regardless of whether or not the cross sectional shape of the hole has been altered from circular to oblong.

I claim:

1. An expansible pivoting means of the character described comprising a split bushing having an external shoulder between the ends thereof and having a portion forming a wrist pin for rotating in a bearing, the bushing having a bore with a tapered portion, a pin in the bore having a tapered portion, and a nut threaded on one end of the pin.

2. An expansible pivoting means of the character described comprising a split bushing having an external shoulder between the ends thereof, the bushing having a bore with a tapered portion extending through that portion of the bushing which extends from the shoulder to one end of the bushing, a pin in the bore having a tapered portion engaging the tapered bore portion, and a nut threaded on one end of the pin and bearing against one end of the bushing.

3. The combination with a pitman and a crank having a hole tapering uniformly from side to side of the crank, of a split bushing having an external shoulder and having an external tapered portion extending from the shoulder to one end of the bushing, the tapered portion of the bushing fitting the tapered hole, the bushing having a cylindrical portion extending through the pitman, the bushing having a tapered bore portion extending through the externally tapered portion, a pin extending through the bushing and having a tapered portion engaging the tapered bore portion and projecting from the other end of the bushing, and a nut threaded on the projecting end of the pin.

4. An expansible pivoting means of the character described comprising a split bushing having an external shoulder between the ends thereof and having a portion forming a wrist pin for rotating in a bearing, the bushing having a bore with a tapered portion, and a threaded connection for holding the pin in place.

Signed at Los Angeles, California, this 7 day of April, 1925.

ERNEST V. STONE.